Dec. 21, 1954 P. E. GATES 2,697,806

GLASS ENCLOSED ELECTRICAL TRANSLATOR

Filed March 9, 1949

INVENTOR.
Paul E. Gates
BY A. B. Richardson
ATTORNEY 2,697,806

GLASS ENCLOSED ELECTRICAL TRANSLATOR

Paul E. Gates, Danvers, Mass., assignor to Sylvania Electric Products Inc., a corporation of Massachusetts Application March 9, 1949, Serial No. 80,358
8 Claims. (Cl. 317—236)

The present invention relates to "point-contact" semiconductor units, and to methods of forming such units. These devices at present have widest application in the crystal rectifier field.

The semiconductor in one widely used type of crystal rectifier is of germanium including a trace of tin, the desired crystalline structure and surface characteristics resulting from careful processing. A pointed wire as of tungsten of a few thousandths of an inch in diameter is made to contact a sensitive surface of the crystal under carefully adjusted pressure. Commonly a brief burst of current is passed through the unit to impart electrical stability and mechanical stability, to some extent, and to improve the rectification efficiency.

Heretofore the electrically active components of such a crystal rectifier, namely, the semiconductive crystal and the cat whisker, have commonly been assembled in a three-part capsule. Two end parts, externally shouldered and threaded brass bushings, are screwed into the ends of a ceramic tube. The cat whisker and the crystal, attached to rods, are inserted axially through the bushings to establish proper mutual contact within the hollow of the ceramic sleeve. After assembly and electrical tests, the ceramic tube is filled with a material that is intended to stabilize the rectifier characteristics. The processing of semiconductors and the techniques and forms of diode assembly are described in "Crystal Rectifiers" by Torrey and Whitmer, vol. 15 of the Radiation Laboratory Series, published 1948 by McGraw-Hill Book Company.

While the foregoing type of construction has met with considerable success, it has proved to be high in cost, so that its application in circuits has been restricted to those requiring the unique properties characteristic of crystal diodes. Furthermore its immunity to the effects of repeated increases and decreases of humidity is inadequate for some purposes.

Copending application Serial No. 50,637 filed September 22, 1948 by Ralph B. Collins, Jr., discloses two new forms of crystal rectifier employing a glass capsule enclosing a semiconductor and a contacting cat whisker, with supporting leads hermetically sealed through the wall of the capsule. In that application the difficulties are considered of completing the assembly in such manner as not disturb the point-contact of the cat whisker on the crystal in adjusted conditon, guarded against damaging heat. An object of the present invention is to provide a semiconductor unit having a compact envelope wholly of glass or like vitreous material, sealed hermetically and firmly retaining a crystal and a cat whisker critically in assembled position. The term "glass" is used in its larger sense to include equivalent materials. Reference is also made to my copending application Serial No. 51,584, filed September 22, 1948, of which this is a continuation-in-part, and to my copending application, Serial No. 46,145, filed August 25, 1948, now Patent 2,626,985, issued January 27, 1953.

The nature of the invention, together with its various features of novelty and further advantages, will be readily appreciated from the following detailed disclosure of an illustrative embodiment, shown in the accompanying drawings, wherein.

Figure 4:
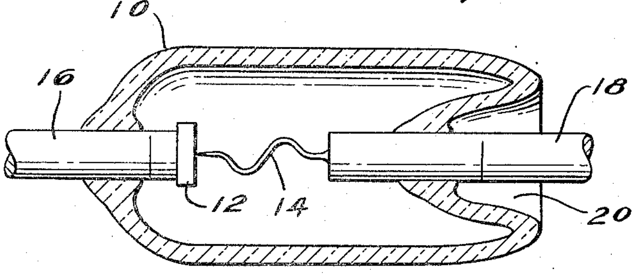
Fig. 4 is a longitudinal sectional view of a completed diode of novel construction.

In Fig. 4 of the drawings, envelope 10 encloses a chip 12 of germanium of appropriate surface characteristics and internal composition and structure for rectification. Cat whisker 14 is also enclosed in envelope 10, being formed with appropriate bends to impart resilience, to insure proper contact between the cat whisker and the crystal that is sustained despite thermal expansion and contraction of the component parts. Leads 16 and 18 are sealed through the envelope wall and provide separate mechanical support and electrical connection for crystal 12 and cat whisker 14. While leads 16 and 18 have the apparent proportions of rods, they actually represent wires. The entire outside diameter of the envelope is of the order of one-fourth of an inch. Since envelope 10 is entirely of electrically low-loss insulation, the capacitance of the unit is a minimum. The length of surface path for electrical leakage between conductors 16 and 18 is considerably greater than the distance between the parts of the envelope penetrated by the leads, by virtue of reentrant wall portion 20 of the envelope.

Figure 1:
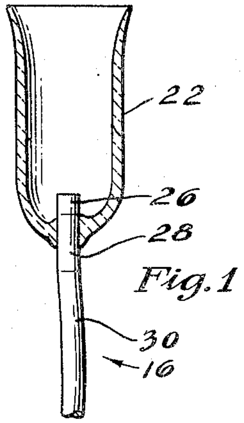
Figs. 1 and 2 are longitudinal sections of subassemblies formed in the manufacture of a crystal diode in accordance with the invention.
Figure 2:
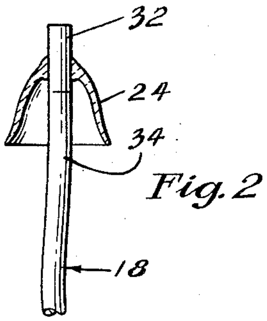

In Figs. 1 and 2 leads 16 and 18 are shown sealed through glass cup-shapes 22 and 24 that are to constitute envelope 10. These subassemblies are formed in initial operations. Lead 16 is a composite of three sections 26 of nickel, 28 of dumet or like material having a temperature coefficient closely equaling that of the particular type of glass, and copper wire 30. Lead 18 has sections 32 of dumet or the like and 34 of copper.

After the subassemblies in Figs. 1 and 2 are fabricated, and the relatively high temperature required to seal the leads in has diminished, a germanium chip 12 (or other semiconductor carefully processed for the necessary characteristics) is attached as by low-temperature soldering to the nickel end 26 of conductor 16. A cat whisker as of resilient nickel-plated tungsten wire is appropriately formed and electrically butt-welded to the inner end of conductor 18. By making the glass seals about the dumet wire portions 28 and 32, in preliminary operations, the carefully processed crystal is not exposed to the damaging heat required for the sealing operation, and the temper of the resilient tungsten wire is protected from the same high sealing temperatures. The cat whisker is welded to the lead projecting from convex wall portion 24 to facilitate access by welding tools.

Figure 3:
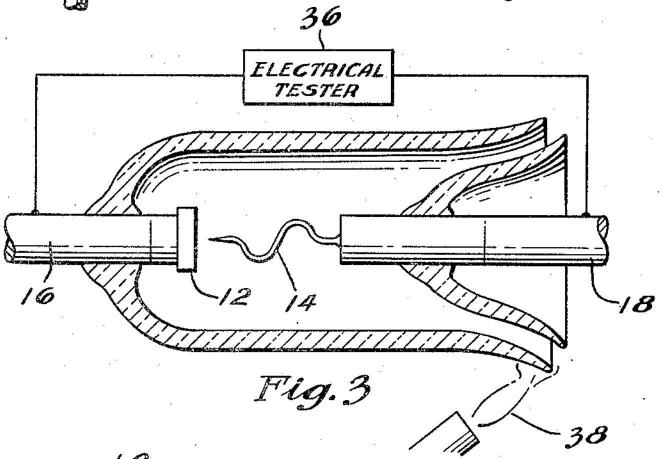
Fig. 3 is a longitudinal section of the subassemblies in Figs. 1 and 2 with the crystal and cat whisker added and in condition for the necessary final assembly operation in completing the crystal.

The subassemblies with the crystal and cat whisker firmly attached are then assembled as in Fig. 3 in a mechanical jig enabling accurate support of both subassemblies while they are brought into coaxial nested relationship. Ultimately the cat whisker is brought to bear with necessary pressure on a sensitive surface portion of crystal 12. The proper pressure and positioning of the cat whisker is checked electrically by conventional tester 36 connected between leads 16 and 18. A hot pointed flame 38 is finally brought to bear across the edges of glass portions 22 and 24, quickly sealing them together. The quantity of material to which the hot flame is applied is held to a minimum and the conduction of heat from the fused edges to the cat whisker and the crystal is minimized by the length of thin-walled glass between the edges fused to form a seal and those heat-sensitive crystal elements. Despite the heat-isolating lengths of glass wall constituting the envelope, the overall length of the envelope is minimized by the doubled-back or reentrant envelope construction. The crystal, which is particularly susceptible to damage by high temperatures, is supported at a greater distance from the final glass seal than the cat whisker.

Despite the foregoing precautions against overheating of critical components, there is nevertheless an appreciable heating of the glass walls and of the confined volume of air; so that when the seal is complete and the unit finally allowed to cool to normal temperatures, a partial vacuum is established. The amount of water vapor retained tends in part to be captured on the internal surfaces of the envelope where it remains despite moderate variations in temperature to which the unit is likely to be exposed during use. Consequently, the crystal is protected from deleterious attack by atmospheric moisture such as should otherwise be anticipated from an imperfectly sealed and stuffed ceramic capsule that undergoes a certain "breathing" action incidental to repeated reverses in atmospheric conditions.

The foregoing invention will naturally be found adaptable to certain modifications of detail such, for example, as in the manufacture of semi-conductor amplifiers wherein plural cat whiskers 14 with separate leads 18 are to be brought into contact with a prepared germanium crystal 12. Also, cup 22 may alternatively be sealed directly to lead 18, omitting cup 24, provided that the point where the fused connection is made is sufficiently distant from the crystal. This detail results in a comparatively longer diode. The appended claims should consequently be allowed an appropriate latitude of interpretation, consistent with the spirit and scope of the invention.

What is claimed is:

1. An electrical unit comprising a semi-conductive crystal, a resilient cat whisker in contact with said crystal, a vitreous envelope having a reentrant portion, and leads fused through said envelope at opposite ends thereof and separately supporting said crystal and said resilient cat whisker and firmly maintaining critical contact therebetween, one of said leads being sealed through said reentrant portion.

2. An electrical unit comprising a cat whisker and a crystal separately supported in proper mutual contact by leads fused through an envelope wholly of glass and having a concave end portion, that lead supporting the cat whisker being sealed through said concave end portion.

3. A tiny, compact electrical unit comprising a semiconductive crystal, a resilient cat whisker in contact with said crystal, a vitreous envelope having a reentrant end portion, and leads extending through fused seals in said envelope at opposite ends thereof and separately supporting said crystal and said resilient cat whisker and firmly maintaining critical contact therebetween, the whisker supporting lead extending through said reentrant portion and the crystal supporting lead extending through the oppostie end of the envelope end.

4. A tiny, compact electrical unit including a crystal of a type susceptible to damage by glass-fusing heat, a resilient sharp contact in engagement with said crystal, a vitreous envelope having a reentrant portion, a lead having a fused seal to said envelope and extending through the reentrant portion of the envelope and firmly supporting said sharp contact in engagement with said crystal, and a second lead sealed through the opposite end of the envelope and firmly supporting said crystal.

5. A diminutive electrical device including a semiconductor body susceptible to damage by glass-fusing heat and a resilient wire firmly pressed in endwise contact against the body, a vitreous envelope hermetically sealed about said wire and said body, a first lead supporting said body and extending through a fused seal in one end portion of the envelope and a second lead firmly supporting the resilient wire and extending through a fused seal in the opposite end portion of the envelope, and a fused annular seal between said two end portions of the envelope.

6. A tiny electrical device including a body of semiconductor material susceptible to damage by temperatures approaching glass-fusing heat, a wire in endwise pressure contact with said semiconductor body, an envelope hermetically sealed about said body and said wire, and a pair of leads respectively supporting said body and said wire from opposite ends of the envelope and having fused seals through the envelope, said envelope including two portions a respective one of which supports each of said leads, said portions being sealed to each other, said portions having a fused seal to each other between the respective seals to the leads, one of said portions being reentrant and supporting the lead that supports the wire contact.

7. A diminutive electrical device including a semiconductor body susceptible to damage by glass-fusing heat and a resilient wire firmly pressed in end-wise contact against said body, a vitreous envelope hermetically sealed about and enclosing said wire and said body, a first lead extending via a fused vitreous hermetic seal through one end portion of the envelope and joined to said body, said body being firmly supported substantially only where the body and the lead are joined, and a second lead extending via a fused vitreous hermetic seal through the opposite end portion of the envelope and firmly supporting said resilient wire, and a fused annular vitreous hermetic seal joining said end portions of the envelope.

8. A diminutive electrical device including a semiconductor body susceptible to damage by glass-fusing heat and a resilient wire firmly pressed in end-wise contact against said body, a vitreous envelope hermetically sealed about and enclosing said wire and said body, a first lead extending via a fused vitreous hermetic seal through one end portion of the envelope and joined to said body, said body being firmly supported substantially only where the body and the lead are joined, and a second lead extending via a fused vitreous hermetic seal through the opposite end portion of the envelope and firmly supporting said resilient wire, and a fused annular vitreous hermetic seal joining said end portions of the envelope, said annular seal being formed at the end of the envelope remote from said body.

References Cited in the file of this patent

UNITED STATES PATENTS

| Number | Name | Date |
|---|---|---|
| 756,676 | Midgley | Apr. 5, 1904 |
| 817,664 | Plecher | Apr. 10, 1906 |
| 1,782,129 | Andre | Nov. 18, 1930 |
| 2,395,991 | Chilcot et al. | Mar. 5, 1946 |
| 2,414,137 | Branson | Jan. 14, 1947 |
| 2,415,841 | Ohl | Feb. 18, 1947 |
| 2,429,933 | Gibson | Oct. 28, 1947 |
| 2,432,116 | McLean et al. | Dec. 9, 1947 |
| 2,475,940 | Brittain | July 12, 1949 |
| 2,484,428 | Smith | Oct. 11, 1949 |

FOREIGN PATENTS

| Number | Country | Date |
|---|---|---|
| 251,706 | Great Britain | May 11, 1926 |